United States Patent [19]
Feeney

[11] Patent Number: 6,144,841
[45] Date of Patent: Nov. 7, 2000

[54] METHOD AND SYSTEM FOR MANAGING FORWARD LINK POWER CONTROL WITHIN A CODE-DIVISION MULTIPLE ACCESS MOBILE TELEPHONE COMMUNICATION NETWORK

[75] Inventor: Michael Stephen Feeney, Allen, Tex.

[73] Assignee: Nortel Networks Corporation, Montreal, Canada

[21] Appl. No.: 09/037,603

[22] Filed: Mar. 10, 1998

[51] Int. Cl.[7] .............................. H04Q 7/22; H04B 1/02; H04B 7/005
[52] U.S. Cl. ................................ 455/69; 455/70; 455/522
[58] Field of Search .............................. 455/69, 70, 422, 455/522; 370/318, 320, 332, 333, 342, 442; 330/129; 327/346

[56] References Cited

U.S. PATENT DOCUMENTS 5,745,520  4/1998  Love et al. ............................ 455/522
5,771,461  6/1998  Love et al. ............................ 455/69
5,778,309  7/1998  Tuttle et al. .......................... 455/70
5,893,035  4/1999  Chen ..................................... 455/69

*Primary Examiner*—Daniel S. Hunter
*Assistant Examiner*—Meless Zewdun
*Attorney, Agent, or Firm*—John D. Crane; Felsman, Bradley, Vaden, Gunter & Dillon, LLP

[57] ABSTRACT

A method for managing forward link power control within a code-division multiple access mobile telephone communication network is disclosed. A mobile telephone communication network constantly monitors for a frame erasure reported by a mobile telephone. In response to the detection of a frame erasure, the mobile telephone's digital gain assigned to the mobile telephone by the mobile telephone communication network is increased by a step-up value to close the forward link. This step-up value may be different each time depending on the speed and position of the mobile telephone. Afterwards, the digital gain is continuously reduced in an exponential manner until another frame erasure is reported.

18 Claims, 3 Drawing Sheets

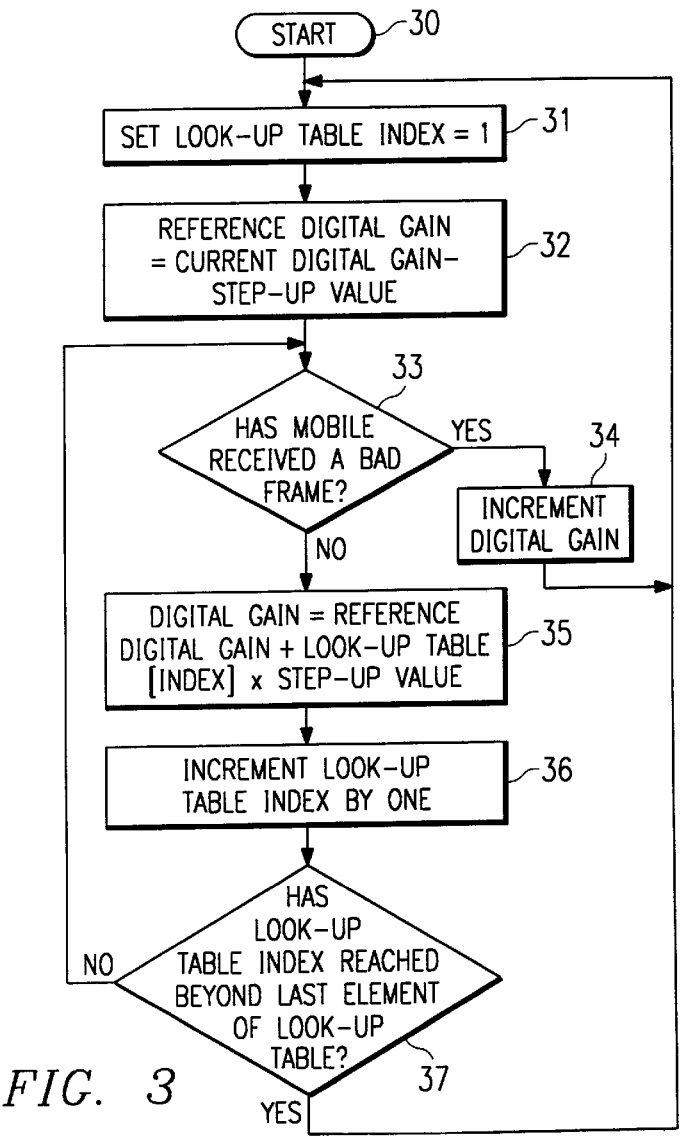

6,144,841

METHOD AND SYSTEM FOR MANAGING FORWARD LINK POWER CONTROL WITHIN A CODE-DIVISION MULTIPLE ACCESS MOBILE TELEPHONE COMMUNICATION NETWORK

BACKGROUND OF THE INVENTION

1. Technical Field

The present invention relates to a method and system for servicing a wireless communication network in general, and in particular to a method and system for servicing a mobile telephone communication network. Still more particularly, the present invention relates to a method and system for managing forward link power control within a code-division multiple access mobile telephone communication network.

2. Description of the Prior Art

A code-division multiple access (CDMA) communication system is a spread-spectrum communication system in which multiple mobile telephones (mobiles) have access to the same frequency band. If each individual mobile within a CDMA communication system is allowed to have a different received signal strength, near-far interference may occur. In other words, the signal from a near mobile may interfere with the signal from a mobile that is far away. Such near-far interference is detrimental to the quality of a CDMA communication system and can degrade performance, reduce capacity, and induce call drops. Hence, the transmitting power of each mobile has to be controlled so that the received power at a cell is constant at a predetermined level, regardless of the distance between mobiles and the base station. Typically, a mobile power control unit is utilized to produce a nominal received power from all mobiles within a given cell or sector. According to the North American IS-95 standard, CDMA power control is a three step process: (1) reverse link open-loop power control; (2) reverse link closed-loop power control; and (3) forward link power control.

Reverse link open-loop power control is accomplished by adjusting the transmit power of a mobile such that the received signal at a base station is constant regardless of the mobile distance. Each mobile computes the relative path loss and compensates the path loss by self-adjusting its transmitting power. The total received power at the cell site is the sum of all powers, which determines the system reverse link capacity.

Reverse link closed-loop power control is accomplished by means of a power up or power down command originating from the cell site. Every 1.25 ms, a single power control bit (e.g., a "1" for power down by 0.5 dB and a "0" for power up by 0.5 dB) is inserted into a forward encoded data stream. Upon receiving this command from the base station, the mobile responds by adjusting the power by an amount of ±0.5 dB.

The goal of forward link power control is to allocate each forward traffic channel with just enough digital gain to close the forward link; that is, to provide the mobile with just enough signal power to meet the required $E_b/N_o$ (i.e., signal-to-noise requirement) for the mobile. Needless to say, allocating too little digital gain will result in a degraded or dropped call, but allocating too much digital gain will result in a reduction of sector capacity. Because the digital gain needed to close the forward link varies with changes in channel conditions, changes in mobile position as well as speed, and changes in soft/softer handoff status, the allocation of forward traffic channel gain must be dynamic.

In order to protect against allocating a mobile too much digital gain, a linear-decay algorithm is currently employed for performing forward link power control. This linear-decay algorithm, however, may also provide a higher than necessary average digital gain when the mobile's required $E_b/N_o$ does not change. Because the forward link capacity is inversely proportional to the square of the average digital gain, it is desirable to provide an improved method for managing forward link power control such that the digital gain of a mobile is minimized while maintaining the target frame error rate (FER) for the mobile.

SUMMARY OF THE INVENTION

In view of the foregoing, it is therefore an object of the present invention to provide an improved method for servicing a wireless communication network.

It is another object of the present invention to provide an improved method and system for servicing a mobile telephone communication network.

It is yet another object of the present invention to provide an improved method and system for managing forward link power control within a code-division multiple access mobile telephone communication network.

In accordance with a method and system of the present invention, a mobile telephone communication network constantly monitors for a frame erasure reported by a mobile telephone. In response to the detection of a frame erasure, the mobile telephone's digital gain (i.e., the digital gain assigned to the mobile telephone by the mobile telephone communication network) is increased by a step-up value to close the forward link. This step-up value may be different each time depending on the speed and position of the mobile telephone. Afterwards, the digital gain is continuously reduced in an exponential manner until another frame erasure is reported.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 3 is a high-level logic flow diagram of a method for providing a forward link power control within a CDMA mobile telephone communication network, in accordance with a preferred embodiment of the present invention;

FIG. 4 is a block diagram of a look-up table for providing a forward link power control within a CDMA mobile telephone communication network, in accordance with a preferred embodiment of the present invention;

DETAILED DESCRIPTION OF A PREFERRED EMBODIMENT

Figure 1:
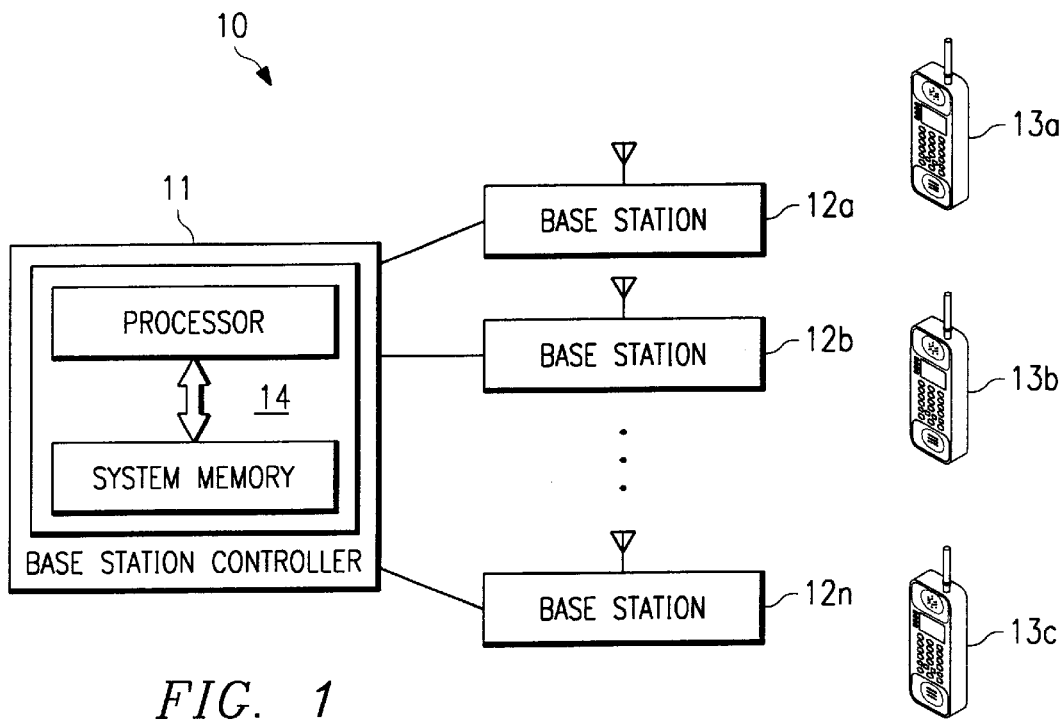
FIG. 1 is a pictorial diagram of a mobile telephone communication network in which a preferred embodiment of the present invention may be implemented.

Referring now to the drawings and in particular to FIG. 1, there is depicted a pictorial diagram of a mobile telephone communication network 10 in which a preferred embodiment of the present invention may be implemented. Preferably, communication network 10 utilizes a code-division multiple access (CDMA) protocol. As shown, communication network 10 includes several base stations 12a–12n located at various locations within communication network 10. Each of base stations 12a–12n is controlled by a base station controller 11. Within the service area of communication network 10, there are several mobile telephones, such as mobiles 13a, 13b, and 13c. A constant communication must be maintained between a mobile and one of base stations 12a–12n when the mobile is being utilized to communicate with other telephones.

Typically, a computer system 14 is located within base station controller 11 for providing a forward link power control as part of the CDMA power control process. Computer system 14 may be, for example, a midrange computer or a mainframe computer having a processor and a main memory as is well-known to those skilled in the art. The software for performing forward link power control commonly resides within computer system 14. Under the prior art, the algorithm for providing forward link power control is based upon a required steady-state digital gain; that is, the prior art algorithm is based upon the assumption that a fixed $E_b/N_o$ is required by a mobile in order to maintain its target frame error rate (FER).

Figure 2:
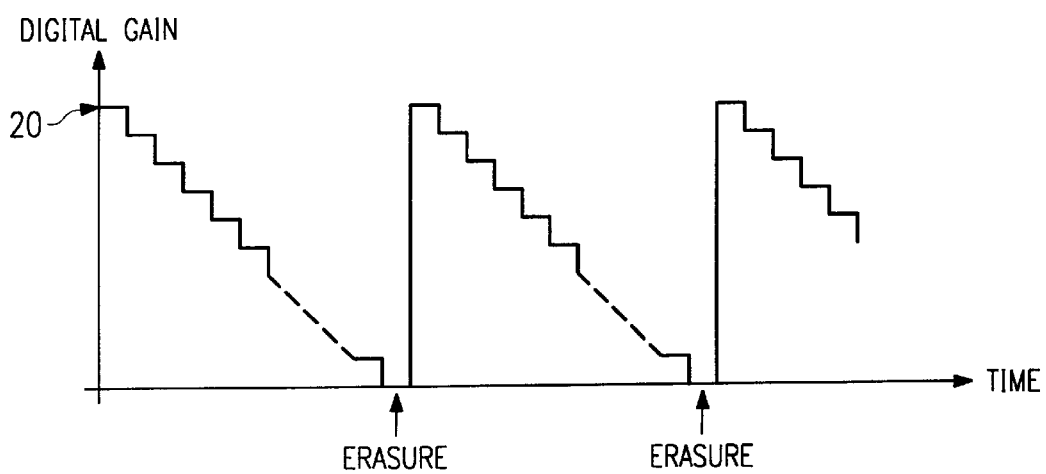
FIG. 2 is a graphical diagram illustrating the prior art forward link power control algorithm with a linear decay.

With reference now to FIG. 2, there is depicted a diagram graphically illustrating the algorithm for providing a forward link power control under the prior art. After a mobile reports that a bad frame has been received, the mobile's current digital gain is increased by a predetermined step size, thus resulting in a new digital gain level 20. This new digital gain level 20 will probably produce a received $E_b/N_o$ that is much higher than the mobile actually requires. Thus, the digital gain will be reduced constantly from level 20 in a linear fashion (i.e., it decays in equal-sized steps). When the digital gain has been reduced to a value just below the required $E_b/N_o$ for the mobile's target FER, a frame erasure will occur. At this time, the mobile reports a frame erasure, and the digital gain will increase back to digital gain level 20 once again (the new digital gain level may be different each time depending on the current digital gain level prior to the increase). This cycle repeats itself throughout the usage of the mobile.

With the prior art algorithm for providing forward link power control, there will be an erasure in every one out of N frames, where N is determined by the data filled target FER. The fact is, in a true steady-state environment, there is no need to increase the digital gain each time after the mobile reports a frame erasure, because the required $E_b/N_o$ corresponds to the target FER (one erasure out of every N frames). In other words, maintaining a constant $E_b/N_o$ should be sufficient to guarantee the desired target FER; however, because the wireless channel is time-varying in nature (due to changing shadowing and fading conditions), the digital gain required by the mobile to meet its required $E_b/N_o$ is also time-varying. Furthermore, the mobile's required $E_b/N_o$ itself varies with changes in the mobile's speed, number of received multipaths, and handoff status. Thus, when a frame erasure is reported by the mobile, the base station is not able to discern whether the occurrence of the frame erasure is part of the expected statistics for the current $E_b/N_o$, or due to a sudden shadow or fade that causes the required $E_b/N_o$ to no longer be met, or attributed to the fact that the required $E_b/N_o$ itself has changed and the current $E_b/N_o$ is no longer sufficient. If either one of the latter two scenarios is true, the digital gain will be increased by a significant amount in order to provide the mobile with more $E_b/N_o$. But if the frame erasure is simply due to the expected statistics for the current $E_b/N_o$, the FER should not be affected because the digital gain will be reduced to the same value (or just below that value) in another cycle of the period. Thus, although the prior art algorithm attempts to protect against increases in the mobile's required $E_b/N_o$, the final result is that the average digital gain utilized is higher than what is actually required for those times when the mobile's required $E_b/N_o$ does not change. Because the forward link capacity is inversely proportional to the square of the average digital gain, it is desirable to minimize the digital gain while maintaining the target FER.

As a preferred embodiment of the present invention, an exponentially-decaying algorithm is utilized to minimize the average digital gain with a minimal impact upon the target FER. In the present invention, instead of decreasing the digital gain linearly (i.e., in equal-sized steps), the digital gain is reduced exponentially. Consequently, the digital gain is reduced quickly at first and then more slowly and gradually with time.

Referring now to FIG. 3, there is illustrated a high-level logic flow diagram of a method for providing forward link power control within a CDMA mobile telephone communication network, in accordance with a preferred embodiment of the present invention. After the process begins at block 30, an index to a look-up table is set to a "1," as shown in block 31. An exemplary format of the look-up table is presented in FIG. 4. A reference digital gain value is then set to a current digital gain value minus a step-up value, as depicted in block 32. Preferably, the range of a current digital gain value is from 0 to 255, and the step-up value is about 10 or 20. A determination is made as to whether or not the mobile has received a bad frame, as illustrated in block 33. If the mobile has received a bad frame, then the digital gain is incremented by a step-up value, as shown in block 34. The process then returns back to block 31.

However, if the mobile has received a good frame, then the digital gain is set to the value of the reference digital gain plus the product of the step-up value and a value obtained from the look-up table utilizing the look-up table index, as shown in block 35. The look-up table index is then incremented by one, as depicted in block 36. Next, a determination is made as to whether or not the look-up table index has passed beyond the last element of the look-up table, as illustrated in block 37. If the look-up table index has not passed beyond the last element of the look-up table, the process returns to block 33; otherwise, the process returns to block 31. The digital gain is effectively reduced when the current digital gain is decreased by a complete step-up value at block 32 and only a fraction of the step-up value is gained back at block 35 via the look-up table. The fractional values within the look-up table are chosen to reduce the digital gain in an exponential manner.

With reference now to FIG. 4, there is illustrated a block diagram of a look-up table for providing a forward link power control within a CDMA mobile telephone communication network, in accordance with a preferred embodiment of the present invention. As shown, there are two columns within look-up table 40, namely, index 41 and value 42. Index 41 contain numerical numbers ranging from, for example, 1 to 100. The numerical values within value 42 are computed by the following formula:

$$\text{value} = e^{-\frac{index}{R}} \quad (1)$$

where index is a corresponding numerical number from index 41 and R is a constant. The total number of indices within index 41 is given by the reciprocal of a target FER. For a 1% target FER, the number of index will be 1/0.001=100; and for a 2% target FER, the number of index will be 1/0.002=50. Hence, several different look-up tables are required to accommodate each possible target FER commonly encountered within a CDMA mobile telephone communication network. The parameter R should be chosen such that the value from equation (1) is approximately equal to zero (e.g., 0.02 or less) when the index is at the maximum. For example, with a 1% FER and the maximum index equals 100, R should preferably be 25 such that the value from equation (1) is 0.018 when the index is at 100. As shown in FIG. 4, the number of indices is 100, and R equals 25.

Each value 42 within look-up table 40 corresponds to a normalized digital gain increase value relative to a reference digital gain value. The reference digital gain value will either be the last digital gain value prior to a digital gain increase, or the last digital gain value after the last value in the look-up table minus a step size. In the latter case, after completely stepping through look-up table 40, the index to look-up table 40 would be reset to the first index and the reference digital gain would be set to the current digital gain minus one step size. Thus, the exponentially decaying cycle will repeat itself after each sweep of look-up table 40. Similarly, if there is a digital gain increase, then the index of look-up table 40 will be reset to the first index and the reference value will be set to the value prior to the increase.

Figure 5:
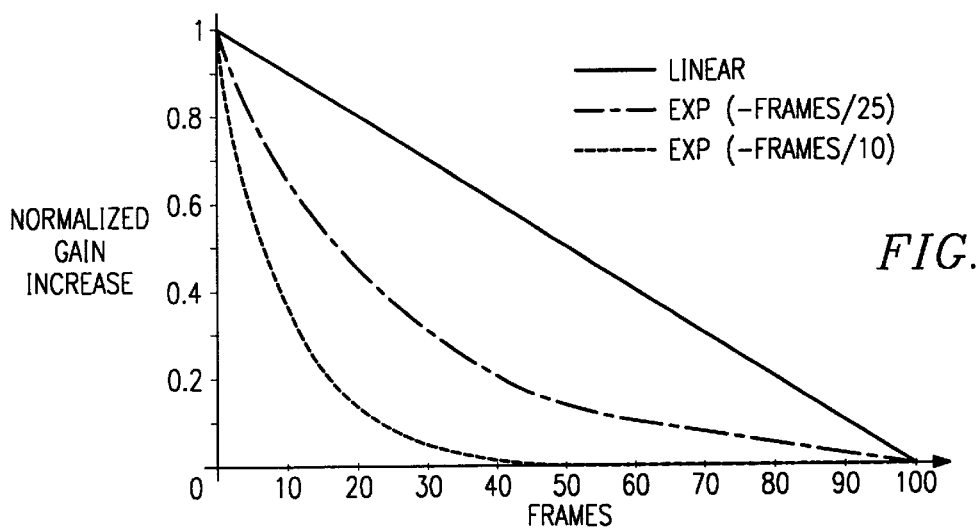
FIG. 5 is a graphical depiction of two exponentially-decaying control curves, in accordance with a preferred embodiment of the present invention.

Referring now to FIG. 5, there is illustrated a graphical depiction of two exponentially-decaying control curves, in accordance with a preferred embodiment of the present invention. As shown, the two different exponential curves—exp(-frames/25) curve and exp(-frames/10) curve—are compared against a linear control curve that represents the prior art algorithm. Both exponential curves will meet the target FER in a true steady-state environment because the starting and ending points of the periodic cycle are identical to that of the prior art algorithm. In FIG. 5, a frame corresponds to an index number as given by equation (1).

Notice as the denominator in the exponential term of equation (1) becomes smaller, the digital gain will decay faster, and as a result, the risk of raising the forward link FER will also be increased. The reason for this risk is that the exponential curve will stay very close to zero for most of the cycle. Taking the exp(-frames/10) curve as an example, the digital gain has almost returned to its prior value after only about 40 frames, whereas the linear curve does not reach the same value for another 60 frames. During those 60 frames, there is an increased probability that the exp(-frames/10) curve will result in a frame erasure. To offset the possibility of an increased FER, an alternative embodiment of the present invention is to provide a hybrid control curve.

Figure 6:
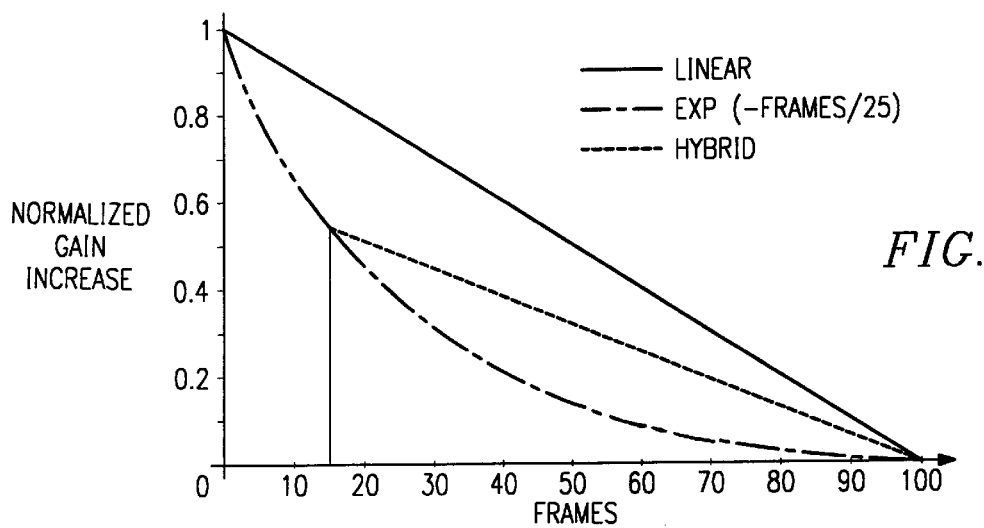
FIG. 6 is a graphical depiction of a hybrid control curve, in accordance with an alternative embodiment of the present invention.

With reference now to FIG. 6, there is illustrated a graphical depiction of a hybrid control curve, in accordance with an alternative embodiment of the present invention. As shown, a hybrid curve follows the exp(-frames/R) curve for the first M points and then decays linearly for the remaining (1/FER-M) points. For example, if the FER is 1%, and M is chosen to be 15, then the digital gain will decay exponentially for the first 15 frames and will decay linearly for the remaining 85 frames. A hybrid curve represents a compromise between the lower average digital gain offered by the exponential curve mentioned previously and the reduction of risk of an increased FER offered by a linear curve.

Figure 7:
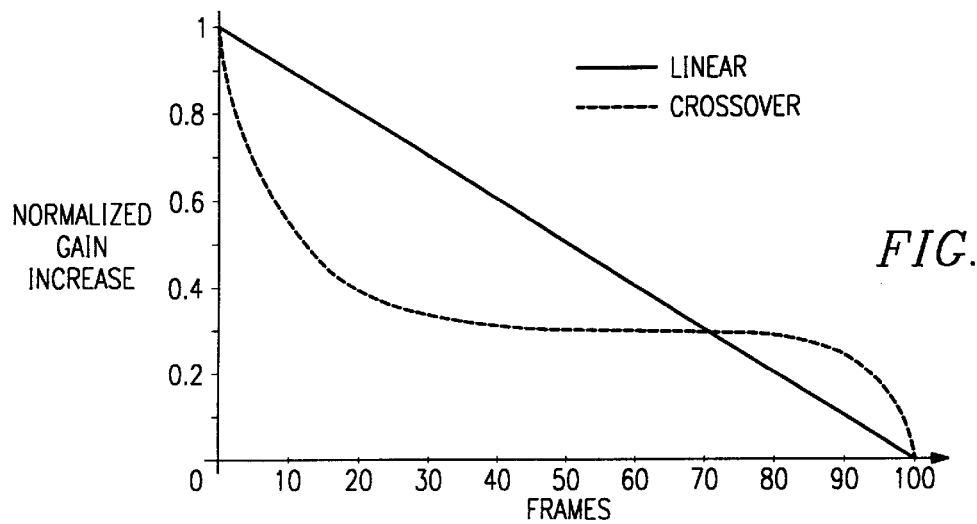
FIG. 7 is a graphical depiction of an exponential decay with crossover control curve, in accordance with yet another alternative embodiment of the present invention.

Yet another embodiment of the present invention provides an "exponential decay with crossover" control curve. Referring now to FIG. 7, there is illustrated a graphical depiction of an exponential decay with crossover control curve, in accordance with a third embodiment of the present invention. As shown, the exponential decay with crossover control curve decreases exponentially at first until a crossover point is reached, after which the exponential decay with crossover control curve decreases in an inverse-exponential manner. One benefit for utilizing an exponential decay with crossover control curve is that in a fixed wireless access environment, the exponential decay with crossover control curve will result in a lower average forward traffic channel digital gain, and hence a lower forward traffic channel power than the linear curve while maintaining the same (or lower) forward link FER. Since forward link sector capacity is inversely proportional to the average required forward traffic channel power, the exponential decay with crossover control curve will result in a higher forward link sector capacity than the linear curve. It is important to note that the exponential decay with crossover control curve does not result in a higher forward link FER than the linear curve. This is an important point because it is always possible to gain capacity by sacrificing FER performance. In other words, a control curve that offers more capacity but also increases the FER at the same time may not truly represent an overall performance improvement.

It is understood by those skilled in the art that an exponential decay with crossover control curve can be implemented with a look-up table such as look-up table 40 as shown in FIG. 4. Equations for generating indices and values for a look-up table for an exponential decay with crossover control curve are as follows:

$$\text{value} = e^{\frac{-(index+offset)}{slope\ 1}} + \text{crossover } y\text{-value}$$

for index<crossover x-value, and $$\text{value} = \text{crossover } y\text{-value} - \left[ \frac{e^{\frac{index-crossover\ x-value}{slope\ 2}}}{\frac{1}{FER}e^{\frac{-crossover\ x-value}{slope2}}} \right] \times \text{crossover } y\text{-value}$$

for index>crossover x-value.

For this embodiment, a desirable crossover x-value and crossover y-value need to be initially chosen. These are the (x,y) coordinates at which the exponential decay with crossover control curve will cross the linear curve. In FIG. 7, the crossover x-value is 70 frames and the crossover y-value is 0.35. Next, the two slope parameters, namely, slope 1 and slope 2, need to be chosen. The parameter slope 1 controls the rate at which the exponential decay with crossover curve will decrease before the crossover point; the decrease rate will be greater as the value of slope 1 decreases. The parameter slope 2 controls the rate at which the exponential decay with crossover curve will decay after the crossover point. The rate of decay will be greater as the value of slope 2 increases. In FIG. 7, slope 1 equals 10, and slope 2 equals 6.

As has been described, the present invention provides an improved method for managing forward link power control within a code-division multiple access mobile telephone communication network. In addition to mobiles, the present invention is also applicable to fixed wireless access applications. The computer system for implementing the present invention may reside in a base station controller as well as in a base station that is controlled by the base station controller. It is important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for managing forward link power control within a mobile telephone communication network, said method comprising the steps of:

detecting frame erasures for a mobile telephone within said mobile telephone communication network;

in response to a detection of a first frame erasure, increasing a digital gain by a step-up value for said mobile telephone to close a forward link; and reducing said digital gain to said mobile telephone in an exponential manner between said detection of said first frame erasure and a detection of a second frame erasure.

2. The method according to claim 1, wherein said reducing step further includes a step of continuously reducing said digital gain to said mobile telephone in an exponential manner until second frame erasure is reported.

3. The method according to claim 1, wherein said reducing step further includes a step of reducing said digital gain to said mobile telephone in an exponential manner and then in a linear manner.

4. The method according to claim 1, wherein said reducing step further includes a step of reducing said digital gain to said mobile telephone in an exponential manner and then in an inverse-exponential manner.

5. The method according to claim 1, wherein said mobile telephone communication network is a code-division multiple access mobile telephone communication network.

6. The method according to claim 1, wherein said increasing step further includes a step of increasing a digital gain to a second predetermined level.

7. A computer system for managing forward link power control within a code-division multiple access mobile telephone communication network, comprising:

means for detecting frame erasures for a mobile telephone within said mobile telephone communication network;

means for increasing a digital gain by a step-up value for said mobile telephone to close a forward link, in response to a detection of a first frame erasure; and means for reducing said digital gain to said mobile telephone in an exponential manner between said detection of said first frame erasure and a detection of a second frame erasure.

8. The computer system according to claim 7, wherein said reducing means further includes a means for continuously reducing said digital gain to said mobile telephone in an exponential manner until second frame erasure is reported.

9. The computer system according to claim 7, wherein said reducing means further includes a means for reducing said digital gain to said mobile telephone in an exponential manner and then in a linear manner.

10. The computer system according to claim 7, wherein said reducing means further includes a means for reducing said digital gain to said mobile telephone in an exponential manner and then in an inverse-exponential manner.

11. The computer system according to claim 7, wherein said mobile telephone communication network is a code-division multiple access mobile telephone communication network.

12. The computer system according to claim 7, wherein said increasing means further includes a means for increasing a digital gain to a second predetermined level.

13. A computer program product residing on a computer usable medium for managing forward link power control within a code-division multiple access mobile telephone communication network, said computer program product comprising:

program code means for detecting frame erasures for a mobile telephone within said mobile telephone communication network;

program code means for increasing a digital gain by a step-up value for said mobile telephone to close a forward link, in response to a detection of a first frame erasure; and program code means for reducing said digital gain to said mobile telephone in an exponential manner between said detection of said first frame erasure and a detection of a second frame erasure.

14. The computer program product according to claim 13, wherein said program code means for reducing further includes a program code means for continuously reducing said digital gain to said mobile telephone in an exponential manner until second frame erasure is reported.

15. The computer program product according to claim 13, wherein said program code means for reducing further includes a program code means for reducing said digital gain to said mobile telephone in an exponential manner and then in a linear manner.

16. The computer program product according to claim 13, wherein said program code means for reducing further includes a program code means for reducing said digital gain to said mobile telephone in an exponential manner and then in an inverse-exponential manner.

17. The computer program product according to claim 13, wherein said mobile telephone communication network is a code-division multiple access mobile telephone communication network.

18. The computer program product according to claim 13, wherein said program code means for increasing further includes a program code means for increasing a digital gain to a second predetermined level.

* * * * *